United States Patent [19]

Rath

[11] 4,058,284
[45] Nov. 15, 1977

[54] INSERT RECEIVING AND SECURING DEVICE

[76] Inventor: Johann Rath, Im Wasen 13, 7141 Benningen, Germany

[21] Appl. No.: 656,274

[22] Filed: Feb. 9, 1976

[30] Foreign Application Priority Data

Feb. 8, 1975 Germany .............................. 2505381

[51] Int. Cl.² ............................................ B29D 27/00
[52] U.S. Cl. ................................. 249/163; 425/817 R
[58] Field of Search ............... 249/112, 113, 121, 141, 249/160, 161, 164, 187 R, 165; 264/DIG. 83, 51, 52; 425/4 R, 817 R; 49/504, 505

[56] References Cited

U.S. PATENT DOCUMENTS

| 3,380,121 | 4/1968 | Chittenden et al. | 249/112 X |
| 3,607,197 | 9/1971 | Ballantine | 249/112 X |
| 3,825,378 | 7/1974 | Dart et al. | 425/4 R |

FOREIGN PATENT DOCUMENTS 524,835  4/1931  Germany ............... 249/112

Primary Examiner—Francis S. Husar
Assistant Examiner—Mark Rosenbaum
Attorney, Agent, or Firm—Walter Becker

[57] ABSTRACT

A device with a shoulder having a supporting and fitting surface for chucking an insert such as a casting mold, especially a foaming mold as it is employed in connection with the foaming of synthetic materials. The device comprises a structure, e.g., a frame structure, with at least three first fitting surfaces which partially extend over second fitting surfaces formed by first rims of an insert and by second rims of holding strips. The insert is provided with third rims over which the holding strips extend.

14 Claims, 10 Drawing Figures

INSERT RECEIVING AND SECURING DEVICE

The present invention relates to a device with a shoulder having a supporting surface and fitting surface for securing an insert such as a mold, especially a foaming mold of the type used in connection with the foaming of synthetic materials.

With devices of this type as for instance mold frames which are employed in particular for foaming synthetic materials, fitting and supporting surfaces of the shoulder are arranged perpendicularly upon each other. The insert for covering or connecting the foaming mold from above which is inserted into the frame and designed as plate has its marginal portions and its bottom side engaging said shoulder. The plate is along its circumference secured in the frame by a plurality of screws which are passed through bores into the plate and are screwed into threaded bores provided in the supporting surface of the shoulder.

In operation, the mold frame and the plate are under high pressure and are exposed to continuous thermal alternating stresses. In conformity with the respective temperature, dimensions of the screws change which as a result thereof become loose and therefore have a plurality of times per day to be post tightened. In view of the high pressure and the play of the screws which become loose in the bores, water steam and water may deposit and collect on the supporting surface of the frame so that water enters the threads of the screws and causes the formation of lime deposits, rust and the like. As a result thereof, it frequently occurs that the screws cannot be screwed out any longer by a screw driver or the like but have to be drilled out. This requires loss of material, time and labor. Aside from these disorders which occur during the molding, especially during the foaming, with these known frames, the insertion and tightening of the screw alone requires considerable time. Thus, for instance, for loosening free moving screws of a medium mold frame with a customary distance between adjacent screws of about 8 cm, approximately 1 hour is necessary. The time required for removing the plate from the mold frame is considerably increased when the screws are blocked by soil deposits or a similar collection of impurities.

It is, therefore, an object of the present invention so to design a device of the above mentioned type with an insert to be arranged therein such as a mold, especially a foaming mold for the casting or foaming of synthetic materials, that the insert will within a short time and with a low requirement of labor be secured in the device and will be removable from the latter while a safe connection in the device will be retained, for instance during the foaming operation.

These and other objects and advantages of the invention will appear more clearly from the following specification in connection with the accompanying drawings, in which.

The device according to the present invention is characterized primarily in that at least three fitting surfaces partially extend over fitting surfaces which are formed by inserted marginal portions and margins of holding strips, and is furthermore characterized in that at least one additional correspondingly designed overlap of the insert margins by the holding strips is provided.

Figure 1:
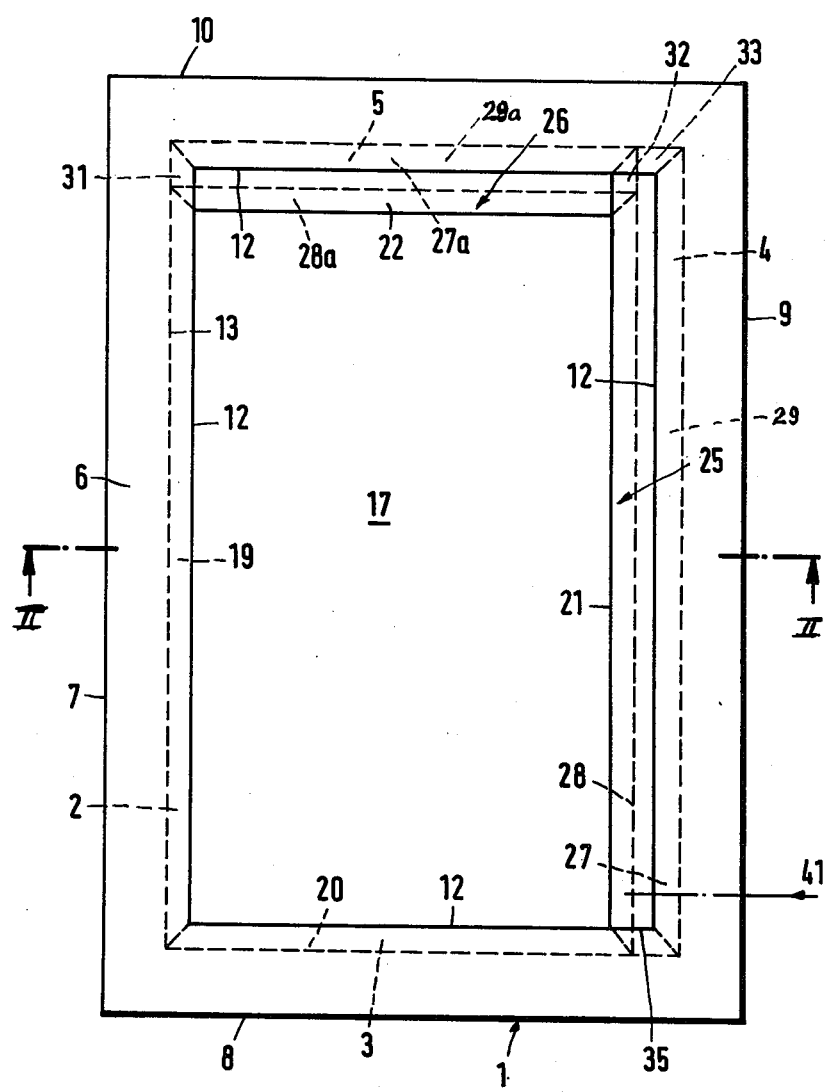
FIG. 1 is a top view of the device according to the invention with an insert in the form of a plate secured therein.

Referring now to the drawings in detail, FIG. 1 illustrates the device 1 according to the invention which is shown as a rectangular frame, especially a receiving device for molding forms. The fitting surfaces 2 to 5 of frame 1 extend from the upper side 6 of frame 1 at an incline in the direction toward the corresponding outer side 7–10 of the frame and in spaced relationship thereto merge below the topside 6 with a supporting surface 11 which extends all the way around and which together with the fitting surfaces 2–5 encloses an acute angle. The upper edges 12 of the fitting surfaces 2–5 have in projection upon the supporting surface 11 a constant distance $a$ from the inwardly located lower edges 13.

Figure 2:
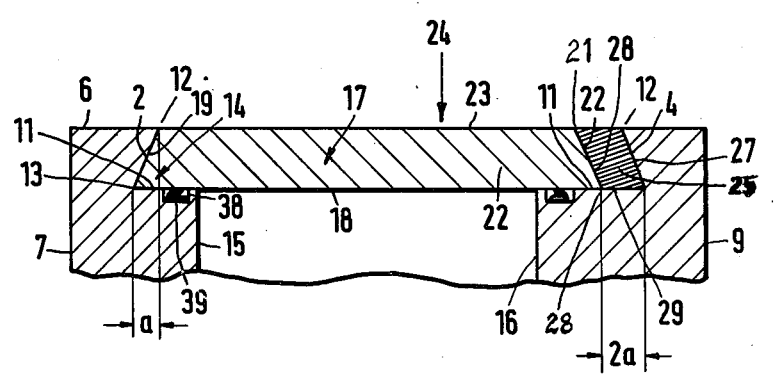
FIG. 2 represents a section taken along the line II—II of FIG. 1, the insert being designed as cover plate.

The fitting surfaces 2–5 of frame 1 and the supporting surfaces 11 form a shoulder 14 over the entire inner circumference of the frame. With the embodiment of FIGS. 1 and 2, the supporting surface 11 of the shoulder 14 is in spaced relationship to the fitting surfaces arranged adjacent the inner surfaces 15 and 16 of frame 1 which extend parallelly with regard to the corresponding outer sides 7–10 of the frame. Into the frame 1 there may be inserted an insert, in the specific embodiment shown in FIGS. 1 and 2, a plate 17 which with its bottom side rests on the supporting surface 11 of the shoulder 14. The secured plate 17 rests with its margins 19 and 20 on the fitting surfaces 2 and 3 whereas the plate margins 21 and 22 engage a holding strip 25 and 26, as will be described later in greater detail. The plate margins 19–22 are plane and in installed position are at the same acute angle as the fitting surfaces 2–5 inclined toward the supporting surface 11.

Figure 3:
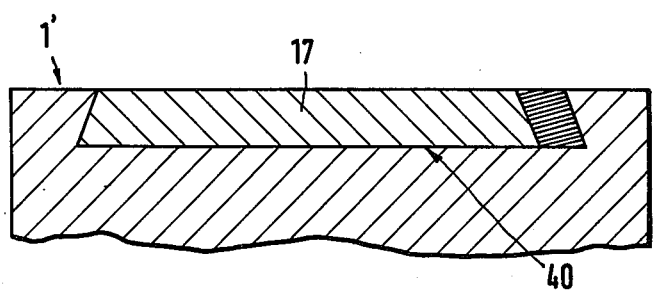
FIG. 3 is a section similar to that of FIG. 2 but slightly modified thereover with an insert designed as building-up or assembly plate.

FIG. 3 shows a different embodiment of the frame according to the invention in which the frame 1' serves for securing an insert that is designed as assembly or connecting plate 17. Frame 1' differs from frame 1 in that it has a closed supporting surface 40 on which in built-in position the plate 17 rests with its entire bottom side 18. In this way, it will be assured that plate 17 cannot bend through, and that the frame 1' will have a high stability.

The surface of the bottom side 18 of the plate is greater than the surface of the upper side 23 of the plate. The maximum length and width of the bottom side 18 of the plate can be selected so as to equal the distance of oppositely located upper edges 12 of frame 1, 1'. Plate 17 is introduced into frame 1, 1' in the direction of the arrow 24 of FIG. 2 and is deposited upon the supporting surface 11 of shoulder 14. The plate rims 19–22 will then from the pertaining fitting surfaces 2 to 5 have a constant distance $a$ measured parallelly to the supporting surface 11. Subsequently, the plate 17 is on the supporting surface 11 displaced first to such an extent that the plate rim 20 or the rim 19 engages the fitting surface 3 or the surface 2 and then is displaced along said fitting surface to a position corresponding to FIG. 1 in which the plate 17 by means of two adjacent plate rims 19 and 20 rests against the fitting surfaces 2 and 3. In this assembled position, the distance of the two other plate rims 21 and 22 from the oppositely located and parallelly extending fitting surfaces 4 and 5, when measured parallelly to the supporting surface 11, amounts to twice the distance $a$. For purposes of securing plate 17, between the plate rim 21 and 22 on one hand and the pertaining fitting surfaces 4, 5 on the other hand, the holding strip 25, 26 is inserted which extends nearly over the entire length of the plate rim 21, 22. The holding strips 25 and 26 preferably have a parallelogram-shaped cross section. The height of said strips 25, 26 corresponds to the height of the plate 17, and its width corresponds to the distance between the plate rim 21, 22 and the fitting surface 4, 5, measured parallelly to the supporting surface 11, so that the holding strips will then with their longitudinal sides 27 and 28, 27a and 28a, engage the fitting surfaces 4 and 5. The holding strips 25 and 26 rest with their bottom side 29, 29a upon the supporting surface 11 whereas their topside 30, 30a is flush with the topside 23 of the plate and with the topside 6 of the frame.

Figure 7:
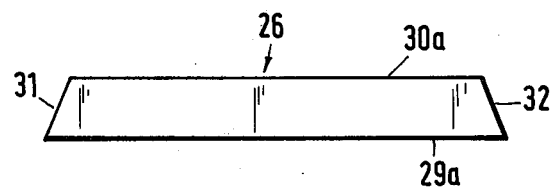
FIG. 7 is a side view of a holding strip to be arranged on a narrow side of the device according to the invention.
Figure 6:
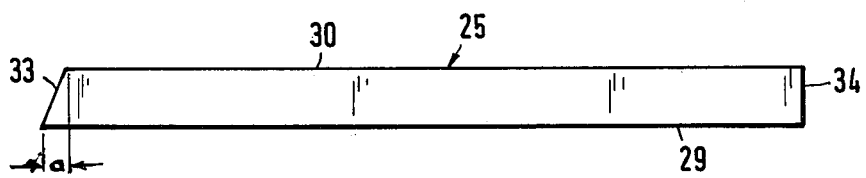
FIG. 6 represents a side view of a holding strip to be arranged on a longitudinal side of the device according to the invention.

For purposes of securing the plate 17, first the holding strip 26 which in side view (FIG. 7) is trapezoidal is at one narrow side of frame 1, 1' inserted vertically from above into the gap between the plate rim 22 and the fitting surface 5. The holding strip 26 is then displaced in the gap in the direction toward the fitting surface 2 until it will with its inclined end face 31 which extends parallel to the fitting surface 2, rest against said end face 31. The oppositely located end face 32 of the holding strip 36 will then be located in one plane with the plate rim 21 and will with said plate rim 21 form a common fitting surface for the holding strip 25 now to be inserted. This holding strip 25 has an end face 33 corresponding to the end face 31 and furthermore has an oppositely located end face 34. The end face 34 extends perpendicularly with regard to the topside 30 of the holding strip 25. The bottom side of the holding strip 25 has a length which exceeds the topside 30 by the length $a$. The length of the topside 30 corresponds to the distance between the upper edges 12 of the fitting surfaces 3 and 4. Due to this design, the holding strip 25 can only at an incline be inserted from above into the gap between the plate rim 21 and the fitting surface 4. The holding strip 25 will then extend with its longitudinal side 28 above the fitting surface which is formed by the plate rim 21 and by the end face 32 of the holding strip 26. The inclined end face 33 of holding strip 25 will then engage the oppositely located fitting surface 5 of the frame. The oppositely located end face 34 has its upper edge 35 engage the upper edge 12 of the frame. In the direction toward the supporting surface 11, the distance between the end face 34 of the holding strip 25 and fitting surface 3 increases and at the supporting surface 11 reaches the value $a$. Since the holding strip 25 with its longitudinal side 28 extends over the holding strip 26 within the region of the end face 32, no separate or additional connecting elements are necessary for connecting said holding strip 26. The longer holding strip 25 in the specific embodiment shown is within the region of its end face 34 secured by means of a pin 41 shown in dot-dash lines in FIG. 1 or by means of a screw or the like. The pin 41 or screw is passed through a non-illustrated recess in the frame. In this way, it will be assured that the plate 17 is safely and sealingly located in the frame 1. The fitting surface 2 extends over the plate rim 19, and the end face 31 of the holding strip 26 and the fitting surface 3 extends over the plate rim 20. Furthermore, the fitting surface 4 extends over the longitudinal side 27 of holding strip 25 which side 27 serves as fitting surface. The fitting surface 5 extends over the fitting surface which is composed of the longitudinal side 27a of holding strip 26 and the end face 33 of holding strip 25. The holding strips 25 and 26 extend in their turn with their longitudinal side 28a over the plate rim 22 and with their longitudinal side 28 extend over the plate rim 21 and end face 32 of the holding strip 26. As a result thereof, it will be assured in a simple manner that the plate, even under the effect of a great force cannot be pressed out of the frame and will firmly rest on the supporting surface 11.

Figure 8:
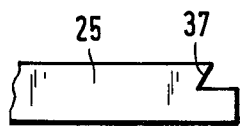
FIG. 8 represents a portion of a holding strip with withdrawing means for withdrawing the holding strips.
Figure 9:
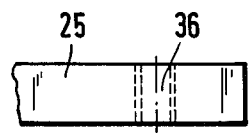
FIG. 9 is a holding strip with different withdrawing means for lifting off the holding strips.

For securing the plate with the holding strips, only a few hand operations and a very small number of individual elements are necessary which permit a simple and fast assembly or disassembly. The holding strips 25 and 26 which with a slight play are arranged in the gap between the fitting surfaces of the frame and of the plate rims can easily and quickly be disengaged by simple means. To this end, threaded bores 36 (FIG. 9) are provided into which withdrawing screws can be inserted in order to pull out the holding strips. As shown in FIG. 8, for instance at the end of the holding strip, a notch 37 may be provided on the top side of said holding strip while for purposes of pulling out the holding strip, a corresponding counter member may be inserted into said notch.

Figure 4:
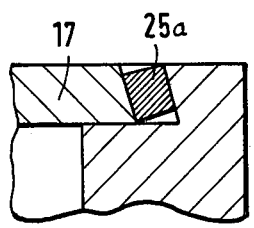
FIG. 4 illustrates in section one embodiment of an inserted holding strip.
Figure 5:
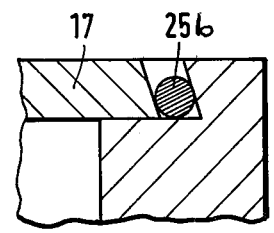
FIG. 5 is a section through a different embodiment of an inserted holding strip.

As shown in FIGS. 4 and 5, for securing the plate in the frame, instead of holding strips with parallelogram-shaped cross section, also holding strips 25a with rectangular cross section or holding strips with round cross section may be employed which can be inserted into the gap between the plate rims 21 and 22 and the fitting surfaces 4 and 5. These holding strips are simpler and therefore less expensive to make than the above described holding strips. The holding strips 25 and 26 which have a parallelogram-shaped cross section are a preferred embodiment since by means of them a completely plane surface can be obtained, whereas when employing the holding strips of FIGS. 4 and 5, the gap between the plate rim and the fitting surface of the frame is not completely filled in. The holding strips may in cross section have the shape of a wedge with cut-off tip. In such an instance, the plate rims and the corresponding fitting surface of the frame no longer extend parallelly to each other. The angle enclosed between the plate rims with the supporting surfaces must be less than the angle between the fitting surface of the frame and the supporting surface so that the holding strips with their longitudinal side extend over the adjacent plate side, and a proper connection of the plate is assured.

Particularly during the foaming operation, when the device is under high steam pressure, it is advantageous to provide a seal in the supporting surface 11 of shoulder 14, in order to prevent steam or water from the foaming chamber formed by the foaming mold, the frame or the plate, from entering between the plate and the frame supporting surface. To this end, a depression 38 is provided in the supporting surface 11 which depression extends parallel to the fitting surface of frame 1. Said depression 38 is located within the region of the plate bottom side 18 resting on the supporting surface 11 and in which depression there is located a seal 39, for instance a lip seal. The frame 1' may according to FIG. 3 also be employed for securing a connecting plate for instance for tools, workpieces or the like or for chucking plates when the same are to be quickly and safely secured in the frame. A further possibility of application consists in connecting control armature panels or contact plates in switch cabinets with a minimum of time and labor.

Figure 10:
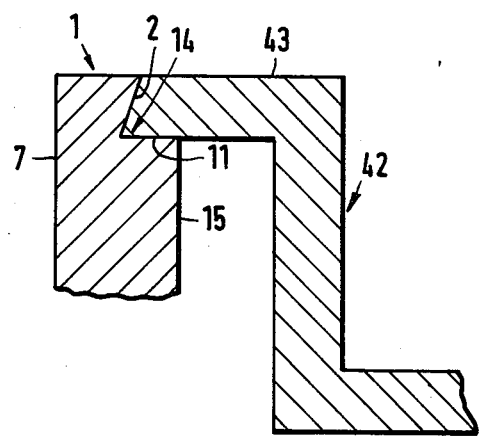
FIG. 10 shows the device according to the invention with an insert designed as foaming mold, FIG. 10 being shown as a fragmentary section similar to the showing of FIG. 2.

According to a further embodiment of the invention, the device according to the invention serves for securing a foaming mold 42 (FIG. 10). The foaming mold 42 is similar to plate 17 vertically from above introduced into the device, deposited on the supporting surface 11 of shoulder 14 and in the same manner as plate 17 is caused to engage the fitting surface 2 and 3. To this end, the molding form has a rim 43 which corresponding to plate 17 has fitting surfaces which will then engage the fitting surfaces of the device. Between the parallel fitting surfaces of the molding form which extend in spaced relationship to the fitting surfaces 4 and 5 of the device, the holding strips 25 and 26 are inserted which then secure the foaming mold 42 during the foaming operation in the device according to the invention.

Due to the design according to the invention, the insert can be secured in the device in a simple manner and in a minimum of time. To this end, the insert is merely vertically from above deposited upon the supporting surfaces of the device and is then on the latter laterally displaced until it engages the fitting surfaces of the shoulder. For securing the insert, the above mentioned holding strips are inserted between the rims of the insert which are located in spaced relationship to the fitting surfaces, and said fitting surfaces of the device and the shoulder. The fitting surfaces of the shoulders which form the insides of the device extend over the rims of the insert and the holding strips, which rims rest against said fitting surfaces. The rims of the holding strips in their turn extend over the rims of the inserts which rims engage said holding surfaces. In this way, it will be assured that the inserts themselves will even if great forces act thereupon retain their position without any charge and cannot be pressed out of the device. For purposes of connecting the insert, only a few elements are necessary which can easily be removed for removing the insert even under unfavorable conditions such as high temperatures and pressures.

It is, of course, to be understood that the present invention is, by no means, limited to the specific showing in the drawings, but also comprises any modifications within the scope of the appended claims.

What I claim is:

1. In combination, an insert having a top side therewith free of screws and problems of leakage associated with loosening thereof due to thermic changes, and a foam mold used during foaming of synthetic materials having first rims with first fitting surfaces, said mold being provided with a structure having at least three second fitting surfaces complementary with the insert, and a plurality of holding strips having second rims with third complementary fitting surfaces, said second fitting surfaces extending at least partially over said first fitting surfaces of said first rims, and over said third fitting surfaces of said holding strips, said insert also being provided with third rims having said holding strips extending thereover.

2. The combination according to claim 1, in which said structure is a frame.

3. The combination according to claim 1, in which said at least three second fitting surfaces are plane and form part of a four-corner frame having a top side surface and lateral outside surfaces, said at least three second fitting surfaces extending from said top side at a slant in the direction toward the adjacent lateral outside surface and in spaced relationship to said top side and below the latter merge with a supporting surface forming part of said frame and with said fitting surfaces forming an acute angle to thereby establish a dovetail-like connection.

4. The combination according to claim 1, in which said at least three second fitting surfaces and said first rims extend parallel to each other.

5. The combination according to claim 3, in which said supporting surface comprises recess means extending around said frame, and which includes sealing means arranged in said recess means.

6. The combination according to claim 5, in which said recess means is parallel to said supporting surface.

7. The combination according to claim 3, in which said holding strips extend at least approximately over the entire length of said supporting surface.

8. The combination according to claim 3, in which at least one of said holding strips has a parallelogram-shaped cross section having a top side flush with said top side surface of said frame and the top side of said insert, said holding strip resting on said supporting surface.

9. The combination according to claim 1, in which at least one of said holding strips has a round cross section.

10. The combination according to claim 3, in which said structure has two relatively short and two relatively long sides, and in which one of said holding strips has a trapezoidal longitudinal section and is located at one of said narrow sides.

11. The combination according to claim 3, in which one of said holding strips has one end located within the region of the other one of said holding strips, and in which one of said second fitting surfaces extends parallel to said other one of said holding strips, said one end of said one holding strip engaging said one of said second fitting surfaces, the other end of said one of said holding strips extending perpendicularly with regard to said supporting surface, and the upper edge of said last mentioned one of said holding strips engaging the upper edge of said structure.

12. The combination according to claim 10, in which one of said holding strips extends along one of the relatively long sides of said structure and has a longitudinal side section projecting beyond said insert in positive engagement with another adjacent holding strip.

13. The combination according to claim 12, which includes connecting means, and in which said one holding strip is at the longitudinal side of said structure within the region of its free end fixedly connected to said structure by means of said connecting means accessible from the outside of said structure.

14. The combination according to claim 8, in which the top side of at least one of said holding strips is provided with means for lifting said last mentioned holding strip out of said structure.

* * * * *